Nov. 30, 1926.

R. K. THOMSON

AUTOMOBILE CURTAIN

Filed July 24, 1920　　2 Sheets-Sheet 1

1,608,914

Inventor
Ralph K. Thomson

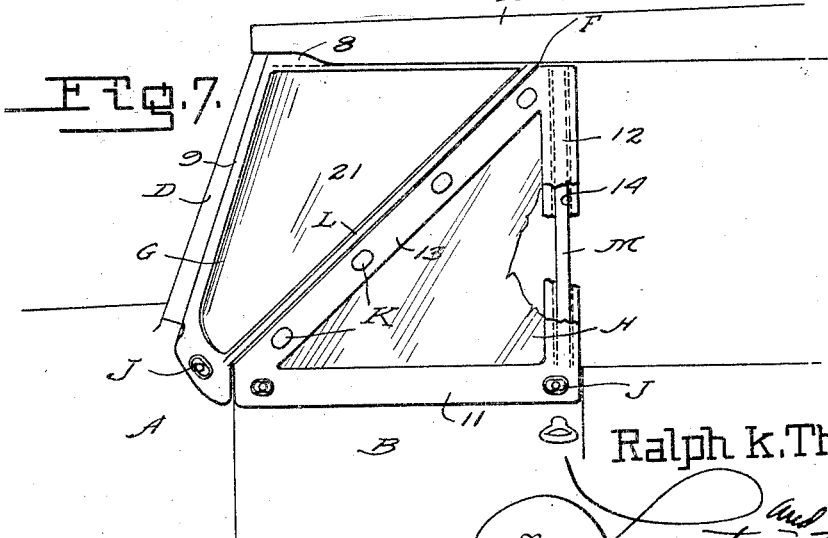

Patented Nov. 30, 1926.

1,608,914

UNITED STATES PATENT OFFICE.

RALPH K. THOMSON, OF SIOUX FALLS, SOUTH DAKOTA.

AUTOMOBILE CURTAIN.

Application filed July 24, 1920. Serial No. 398,702.

The present invention relates to automobile curtains and more particularly to side curtains adapted to be removably supported by the top, body and windshield of open or what is commonly known as pleasure cars, to protect occupants from the wind, rain or snow. The invention embodies improvements in the automobile curtain disclosed in my co-pending application for patent filed June 19, 1919, Serial Number 305,300.

The principal objects of the present invention are, to provide automobile side curtains each comprising two sections adapted for attachment together, to the automobile body and its door, and the wind shield and top, that they may serve effectively to exclude rain, snow, dust, etc.; to so shape the sections of each curtain that one section may be moved relative to the other as by being wholly or partially connected to the door of the automobile body, to facilitate entrance and exit from the automobile; to so shape the sections of the curtain that one section may be used to the exclusion of the other, as a dust or wind shield, yet not interfere with hand signaling, that is, will readily permit the driver of the automobile or other occupants, to extend the arm laterally of the body of the automobile as to indicate a turn, stop, or other appropriate signal; and to so reinforce the marginal portion of one of the sections of each curtain that it will aid in excluding rain, etc., when the two sections are used together, and which will prevent fluttering, so to speak, of the section, when used alone as a wind shield during travel.

Other objects and advantages of the invention will appear in the following detailed description, taken in connection with the accompanying drawings, forming a part of this specification, and in which drawings:

Figure 3 is a detailed elevation of one of the sections of the curtain.

Figure 4 is a similar view of the other section.

Figure 5 is a detailed sectional view through overlapping marginal portions of the curtain sections showing an approved fastening device, and one form of rib formation adapted to exclude rain.

Figure 6 is a similar view showing the modified form of rib formation.

Figure 7 is a detailed view in elevation, parts being broken away and removed to disclose details, showing the application of a curtain embodying my invention and applied to that type of automobile body where the door swings forwardly, when being opened, in contra-distinction to what is shown in Figure 2 of the drawing.

Figure 1:
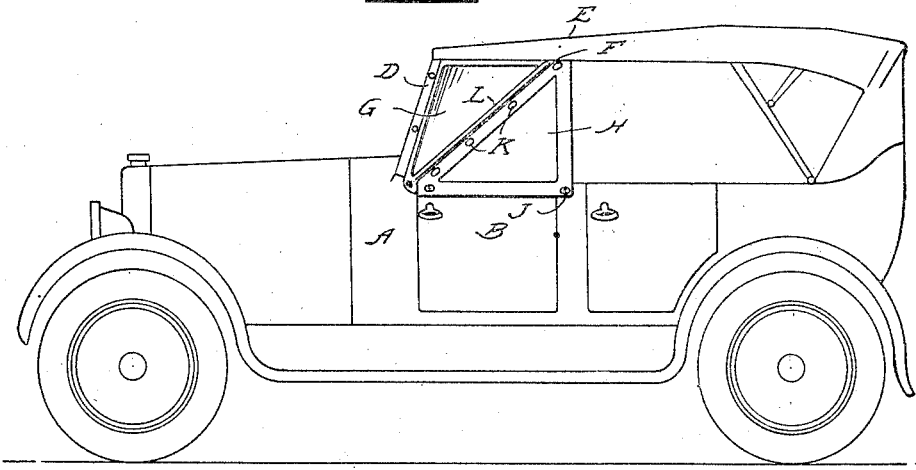
Figure 1 is a side elevation of an automobile equipped with a side curtain embodying the principle of my invention.

In the drawings, where similar characters refer to similar parts throughout the several views, A designates the body of an automobile including hinged doors B; C wind shield including uprights or standards D; and E the top of the automobile, all of which may be of any ordinary or approved construction. The character F designates generally a side curtain comprising sections G and H; J suitable cooperating fastening devices for detachably securing marginal portions of the curtain F to the door B, wind shield standards D; and top E; K suitable cooperating fastening devices for securing marginal portions of the curtain sections G and H together; L a water shed and reinforcement at marginal portion of curtain section G; and M an upright support for a marginal portion of curtain F.

In the example shown, the side curtain F is four sided, and may be of rectangular shape, where applied to that type of vehicle where the wind shield standard is vertical. By referring to this curtain as being of four sided shape it is to be understood that it may be in the form of a trapezoid, trapezium, or any other suitable shape so as to be secured to the body, wind shield standard, and top of the vehicle or at places intermediate the wind shield standard and the back curtain of the vehicle, so as to give good appearance, it being understood that the design of automobile body, in the application of this curtain thereto, may require various alterations in the general shape of the curtain, taken as a whole, and this may be resorted to without departing from the spirit of the invention.

In the example shown, the sections G and H of each side curtain are each substantially of triangular shape, having a general line of division extending from one lower corner portion, diagonally to an upper corner portion thereof, as clearly shown in the drawings, so that curtain section G is provided with a horizontal marginal portion 8, an upright marginal portion 9, and a diagonal marginal portion 10; while the curtain section H is provided with a horizontal marginal portion 11, an upright marginal portion 12, and a diagonal marginal portion 13.

Figure 2:
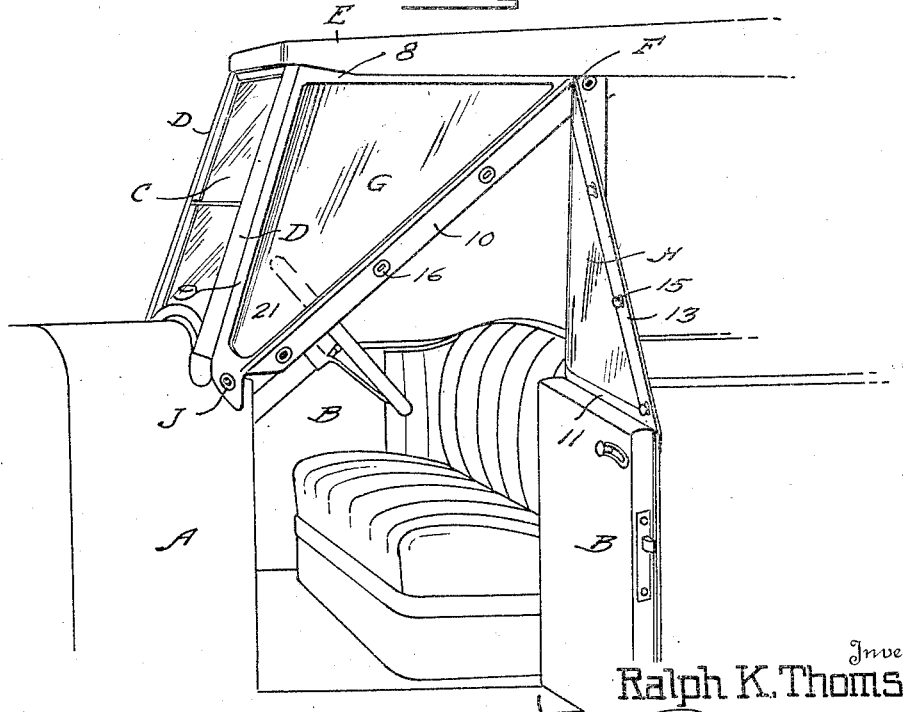
Figure 2 is a perspective view of a portion of the vehicle, with the door open, and showing the manner in which one curtain section may be moved with respect to the other to facilitate entrance or exit with respect to the body.

The marginal portion 9 may be secured to the upright standard D as by suitable fastening devices J, the marginal portion 8, by means of similar fastening devices J, to the top E, and the marginal portion 11 of section H, to the vehicle body A, by similar suitable fastening devices. In the example shown in Figures 1 and 2 marginal portion 11 is secured to the body and also its door B, so as to permit it to swing with the door, these views showing, by way of example, that type of vehicle body where the doors swing rearwardly when being opened. In Figure 7, the same principle is shown applied to that type of vehicle where the door swings forwardly when being opened, and in this particular example, the lower marginal portion 11 of curtain section 8 is carried entirely by the door, a suitable upright M being also carried by the door at its free end portion, this upright being received in a sheath 14 in marginal portion 11 of curtain section H.

When assembled, for the purpose of excluding rain, or snow, the marginal portion 13 of section H overlies marginal portion 10 of section G, which marginal portions are provided with cooperating fastening devices K which, in the example shown, comprise rotatable buttons 15 carried by the marginal portion 13 or curtain section H, and eyes 16 carried by the marginal portion 10 of curtain sections G, the buttons 15 extending inwardly so that these two curtains may be detachably secured together by a person located within the car. They may also be secured together by a person located on the outside of the body of the car, by permitting the door to stand ajar and reaching upwardly to the interior of the curtain. These cooperating fastening devices J are particularly well adapted to securely hold the marginal portions of the curtain sections together, yet readily permit detachment, so that the curtain section H may swing with the door. In order to prevent rain, snow, dust, or other material from working its way between the marginal portions 10 and 13, when the curtain sections are assembled, the water shed and reinforcement L is provided, which, in the example shown, comprises a rib 17 carried by section G, adjacent the line of division between the sections, which rib projects over the adjacent marginal portions 13 of curtain section H and is well adapted to shed rain, as is obvious from an inspection of the drawing. This rib may either be formed by doubling material from which the curtain section is made, upon itself, as shown in Figure 5 of the drawing, or by using a fabric 18 of strip-like formation, doubled upon itself, so as to receive a rigid rod or bar 19, the strip 18 being secured to the curtain section as by stitching 20. It is to be noted that this rib extends with its lower end portion foremost in the normal direction of travel of the vehicle and is diagonally disposed therefrom so as to catch any rain, or wind which may pass over or adjacent the face of curtain section G and prevent it from entering between the marginal portions of the curtain section. It may not be necessary to secure the cooperating fastening devices K in order to effectively prevent the entrance of wind or rain especially where the rib is reinforced by a bar of rigid material.

The curtain section H may be dispensed with, using merely section G as a wind shield, or such section may be produced, as an article of manufacture, for the purpose of shielding occupants of the vehicle from wind, especially incident to travel. The rib or reinforcement L will then serve to prevent fluttering of the diagonal marginal portion of this curtain, fluttering of said curtain being objectionable not only because of the noise, but also because of the liability of cracking of the transparent material 21, such as celluloid, so often used in connection with curtains of this character.

Changes in details may be made without departing from the spirit or scope of my invention; but,

I claim:

1. In combination with an automobile including a body, wind shield standard, and top, of a side curtain therefor of substantially four sided shape and detachably secured at its bottom, side and top margins to the body, wind shield, standard and top of the automobile, respectively, said curtain comprising two sections detachably connected together with the line of division running from adjacent the corner of the curtain at the base of the wind shield standard, rearwardly and diagonally to adjacent the corner at the top of the automobile, and a rib carried by the foremost of said curtain sections overlying the diagonal marginal portion of the other curtain section.

2. In combination with an automobile including a body and a top, of a side curtain therefor of substantially four sided shape and detachably secured at its bottom and top margins to the body and top of the automobile respectively, said curtain comprising two sections detachably connected together with the line of division running from adjacent the corner of the curtain adjacent the automobile body, diagonally and rearwardly in the normal direction of travel of the vehicle, to adjacent the corner of the top of the automobile, and a rib carried by the foremost of said curtain sections overlying the diagonal marginal portion of the other section, to shed rain therefrom.

3. In combination with an automobile including a body provided with a door, and a top, of a side curtain therefor of substantially four sided shape and detachably secured at its lower margin to said door and at its upper margin to said top, said curtain comprising two sections detachably connected together with the line of division running from adjacent the corner of the curtain adjacent the automobile body diagonally and rearwardly in the normal direction of travel of the vehicle, to adjacent the corner of the top of the automobile, said sections of the curtain in overlapping relation at their diagonal marginal portions with the marginal portion of the foremost curtain inwardly of the marginal portion of the other section, fastening devices operable from the inside of the automobile for securing the sections of the curtain together at their diagonal marginal portions, and a rib carried by the foremost of said curtain sections overlying the diagonal marginal portion of the other sections, to shed rain therefrom.

4. In combination with an automobile including a body provided with a door, and a top, of a side curtain therefor of substantially four sided shape and detachably secured at its lower margin to said door and and at its upper margin to said top, said curtain comprising two sections detachably connected together with the line of division running from adjacent the corner of the curtain adjacent the automobile body diagonally and rearwardly in the normal direction of travel of the vehicle, to adjacent the corner of the top of the automobile, said sections of the curtain being in overlapping relation at their diagonal marginal portions with the marginal portion of the foremost curtain inwardly of the marginal portion of the other section, and cooperating fastening devices operable from the inside of the automobile for securing the sections of the curtain together at their diagonal marginal portion.

5. As an article of manufacture, a curtain arrangement for vehicles comprising a forward substantially triangular shaped section, and a rear substantially triangular section, means for detachable connection of said sections to provide a polygonal shaped curtain arrangement the line of connection of which is arranged diagonally thereacross with the rear section overlapping exteriorly on the forward section, and a diagonal weather and wind deflecting rib carried by the forward section extending laterally out of the normal plane of said section forwardly along and adjacent to the overlapping connection of said sections.

RALPH K. THOMSON.